US011082990B2

(12) United States Patent
Palenius et al.

(10) Patent No.: US 11,082,990 B2
(45) Date of Patent: Aug. 3, 2021

(54) SCHEDULING LEGACY UES IN HST BIDIRECTIONAL SCENARIOS

(71) Applicant: Telefonaktiebolaget LM Ericsson (publ), Stockholm (SE)

(72) Inventors: Torgny Palenius, Barsebäck (SE); Maomao Chen, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 70 days.

(21) Appl. No.: 16/461,457

(22) PCT Filed: Nov. 16, 2016

(86) PCT No.: PCT/EP2016/077916
§ 371 (c)(1),
(2) Date: May 16, 2019

(87) PCT Pub. No.: WO2018/091088
PCT Pub. Date: May 24, 2018

(65) Prior Publication Data
US 2019/0349956 A1   Nov. 14, 2019

(51) Int. Cl.
*H04W 4/00* (2018.01)
*H04W 72/12* (2009.01)
*H04L 5/00* (2006.01)
*H04W 28/02* (2009.01)
*H04W 72/04* (2009.01)

(52) U.S. Cl.
CPC ....... *H04W 72/1205* (2013.01); *H04L 5/0069* (2013.01); *H04W 28/0215* (2013.01); *H04W 28/0226* (2013.01); *H04W 72/048* (2013.01)

(58) Field of Classification Search
CPC ......... H04W 72/1205; H04W 28/0215; H04W 28/0226; H04W 72/048; H04L 5/0069
See application file for complete search history.

(56) References Cited

U.S. PATENT DOCUMENTS

| 7,286,504 | B2* | 10/2007 | Sawada | H04W 16/00 370/329 |
| 2013/0035083 | A1* | 2/2013 | Kadel | H04W 84/005 455/418 |
| 2015/0319771 | A1* | 11/2015 | Hill | H04W 72/1257 370/330 |
| 2016/0037550 | A1* | 2/2016 | Barabell | H04B 17/318 455/450 |

(Continued)

FOREIGN PATENT DOCUMENTS

WO   WO-2017171928 A1 * 10/2017 .......... H04W 72/048

OTHER PUBLICATIONS

Qualcomm (Demod performance in multi RRH HST SFN channel model, R4-163.638, May 23-27, 2016). (Year: 2016).*

(Continued)

*Primary Examiner* — Maharishi V Khirodhar
(74) *Attorney, Agent, or Firm* — Baker Botts, LLP

(57) ABSTRACT

A network node for a wireless communication network is disclosed. The network node is adapted for scheduling for communication one or more terminals, the terminals being in a moving vehicle, based on location information and/or capability information pertaining to the one or more terminals. The disclosure also pertains to related methods and devices.

13 Claims, 7 Drawing Sheets

(56) References Cited

U.S. PATENT DOCUMENTS

2018/0041256 A1* 2/2018 Schmidt ................. H04B 7/022
2018/0091373 A1* 3/2018 Manolakos ......... H04L 41/0896

OTHER PUBLICATIONS

Motorola: R1-112441, Coordinated Scheduling (CS) Schemes with Low Power RRH, 2011 (Year: 2011).*
3GPP TSG-RAN WG4 #78 BIS; San Jose del Cabo, Mexico; Source: Qualcomm Incorporated; Title: MCS selection for UE demodulation performance testing in bidirectional HST SFN channel (R4-162630)—Apr. 11-15, 2016.
International Search Report for International application No. PCT/EP2016/077916—dated Aug. 2, 2017.

* cited by examiner

SCHEDULING LEGACY UES IN HST BIDIRECTIONAL SCENARIOS

PRIORITY

This nonprovisional application is a U.S. National Stage Filing under 35 U.S.C. § 371 of International Patent Application Serial No. PCT/EP2016/077916 filed Nov. 16, 2016 and entitled "SCHEDULING LEGACY UEs IN HST BIDIRECTIONAL SCENARIOS" which is hereby incorporated by reference in its entirety.

TECHNICAL FIELD

The present disclosure pertains to wireless communication technology, in particular Radio Access Networks (RANs) according to 3GPP standards, e.g. LTE (Long-Term Evolution) and/or NR (New Radio).

BACKGROUND

In some countries, several vehicles move with the speed over than 300 km/h, e.g., Japan Tohoku Shinkansen (320 km/h), German ICE (330 km/h), AGV Italo (400 km/h), and Shanghai Maglev (430 km/h). With the increase of high speed moving environment, the demand of using mobiles (e.g., terminals like user equipments, UEs) in such an environment in E-UTRA (the LTE is growing larger. Therefore, it is important to guarantee the performance under such environment in E-UTRA.

In 3GPP the performance of a UE in a high speed scenario is specified. The scenario is specified as SFN (single frequency network) scenarios where there are several radio heads (RRH) along the railway belonging to the same cell. Thereby the UE will receive signals from two directions. Since the UE is moving fast on the railway the signals from the two radio heads will have Doppler shifts with opposite sign of the frequency shift, e.g a train moving with 350 km/h and the UE is connected to a base station with a radio signal with carrier frequency 2.7 GHz the Doppler shift of the signal received from the radio head in front of you has Doppler shift 870 Hz while the signal from the radio head the train is leaving has Doppler frequency −870 Hz. Thereby there is a frequency shift of 2*870=1740 Hz between the received signals.

This has been solved in 3GPP, RAN4 for LTE with a new advanced receiver that has a large receiver bandwidth and can handle two signals with this large difference of frequency in such scenarios.

There will, however, be many terminals or UEs without this advanced receiver in the network, and they must be managed.

SUMMARY

The present disclosure provides improved approaches to manage communication for terminals in a moving vehicle, in particular in a train, even if they do not have advanced receiver capability. Communication may generally be managed by scheduling the terminals as suggested herein.

There is disclosed a network node for a wireless communication network. The network node is adapted for scheduling for communication one or more terminals based on location information and/or capability information pertaining to the one or more terminals, wherein the one or more terminals may be in a moving vehicle. The network node may comprise processing circuitry and/or radio circuitry for use in scheduling, and/or a scheduling module for such scheduling. The network node may generally comprise a receiving module for receiving signaling and/or processing circuitry and/or radio circuitry used for such, e.g. a receiver and/or transceiver.

Moreover, there is disclosed a method for operating a network node in a wireless communication network. The method comprises scheduling for communication one or more terminals based on location information and/or capability information pertaining to the one or more terminals, wherein the terminals may be in a moving vehicle.

Generally, it may be considered that scheduling is further based on movement information pertaining to the one or more terminals.

In general, scheduling may be performed and/or intended for terminals between (and/or in an area between) two radioheads associated to the network node. A radiohead associated to a network node may generally be a radiohead controlled by the network node and/or connected to the radio node, and/or utilised by the network node, for transmitting to, and/or receiving from, one or more terminals.

The network node may be further developed to be adapted for transmitting signaling to, and/or receiving signaling from, the one or more terminals utilising two or more radio heads. Alternatively or additionally, it may be considered that the method comprises the network node transmitting signaling to, and/or receiving signaling from, the one or more terminals utilising two or more radio heads.

It may be considered that the location information indicates a location of the one or more terminals in relation to one or more, in particular two, of the radio heads.

Scheduling may comprise configuring one or more of the terminals with a modulation and coding scheme based on information pertaining to the one or more terminals, and/or performing link adaptation based on information pertaining to the one or more terminal.

Further, scheduling may generally comprise prioritizing one or more of the terminals for communication based on capability information and/or location information pertaining to the one or more terminals.

There is also disclosed a program product comprising instructions causing processing circuitry to carry out and/or control a method for operating a network node a disclosed herein. A carrier medium arrangement may be considered, the carrier medium arrangement storing and/or carrying a program product as disclosed herein.

The moving vehicle may in particular be a train, for example a high speed train and/or a train with a speed of at least 150 km/h, at least 200 km/h, at least 250 km/h or at least 300 km/h.

According to the approaches described herein, it may be avoided that the network node allocates resources to all terminals, e.g. based on measurement reports, which may lead to a waste of resources in particular for terminals in a moving vehicle in a middling region between two radioheads. Also, in general more efficient use of resources is facilitated.

In the context of this disclosure, information pertaining to a terminal may generally be and/or comprise location information and/or capability information and/or movement information pertaining to the terminal. Location information and/or movement information and/or capability information pertaining to one or more terminals may comprise individual information for each of the terminals indicating and/or representing the respective location and/or movement and/or capability for each terminal individually. In some cases, such information may pertain to a grouping of terminals, e.g.

movement information pertaining to terminals in the same vehicle, and/or location information pertaining to terminals considered close to each other, and/or a capability information pertaining to a group of terminals sharing or lacking one or more specific capabilities.

Location information may generally indicate the location and/or position of the one or more terminals. It may be considered that location information indicates a distance, and/or distance range (respectively, distances and/or ranges) from one or more radioheads, and/or associated zones. A distance may be associated to signal strength and/or paths related to radiohead position/s. Location information may be based on signaling received from the terminal/s, and/or from the moving vehicle, and/or from a control system associated to the moving vehicle, and/or may be based on historical information pertaining to the one or more terminal/s (e.g., data indication movement and/or locations over time), and/or positioning information pertaining to the one or more terminals (e.g., received from a positioning node and/or determined by the network node), and/or may be based on information pertaining to the moving vehicle, e.g. velocity and/or speed and/or location and/or location history. The network node may comprise processing circuitry and/or radio circuitry (and/or a data interface, e.g. to a core network), and/or an location information obtaining module for obtaining the location information.

Capability information may indicate one or more capabilities and/or functionalities and/or components of a terminal. Capability information may in particular indicate whether the terminal is adapted for and/or with advanced receiver capability, and/or indicate receiving and/or transmitting bandwidth, and/or receiver sensitivity. Advanced receiver capability may represent the capability of receiving with a bandwidth that covers signaling Doppler-shifted upward and/or downwards in frequency from a central and/or nominal transmission frequency, in particular upward and downward, e.g. for terminals moving away from one radiohead and toward another radiohead (the radioheads may be associated to the same network node), e.g. along a traffic link. The capability information may indicate and/or related to a speed (e.g., a maximum speed), which may be associated to a bandwidth covering both Doppler-shifts. Alternatively or additionally, capability information may indicate a capability and/or functionality as defined in a standard, e.g. an optional capability, and/or a capability mandatory for a certain standard release. The speed may be related to a speed representative for the vehicle, e.g. an average and/or nominal and/or typical and/or maximum speed of the moving vehicle. Capability information may be based on received measurement reports, e.g. from the terminal/s, e.g. based on Channel State Information (CSI), in particular CQI (Channel Quality Information). The received measurement report/s may be compared to reporting models or representations indicating expected reporting based on capability information, in particular regarding the presence of an advance receiver or not. Generally, the network node may be adapted for determining capability Information of one or more terminals based on received measurement report/s, wherein the capability information may pertain to advanced receiver and/or associated functionality. The network node may be adapted for using control circuitry and/or radio circuitry (in particular, a receiver) for such determining, and/or comprise a corresponding determining module, and/or may perform such determining.

Movement information may indicate a movement status of a terminal, e.g. speed and/or velocity. The movement information may be indirect, e.g. pertaining to a vehicle the terminal is located in or on.

Scheduling for communication may comprise determining for, and/or allocating to, a terminal, one or more resources for communication, e.g. time/frequency resources. Determining and/or allocating no resources to a terminal (e.g., a terminal requesting resources) may be considered to be determining and/or allocating and/or scheduling. Scheduling may valid for a given and/or specific time interval, e.g. a specific subframe. Scheduling may comprise configuring the terminal/s, and/or transmitting configuration and/or allocation data corresponding to the scheduling to the terminal/s. Scheduling may comprise determining and/or configuring a Modulation and Coding Scheme.

A Modulation and Coding Scheme (MCS) may indicate a modulation (e.g., QPSK, QAM16, QAM32, QAM64, QAM128, QAM256, etc.) and/or coding (e.g., error coding like forward error correction and/or error detection coding). Link adaptation may be considered to comprise determining and/or scheduling a MCS based on operational conditions, e.g. indicated by information pertaining to a terminal. A MCS may pertain to uplink and/or downlink communication. For downlink communication, a configured MCS may indicate to the terminal how to demodulate and/or decode received signaling. For uplink communication, it may indicate to the terminal how to modulate and/or encode transmissions. An aggressive MCS may be associated to a high data rate, and/or many bits of information per symbol. A robust MCS may be associated to a lower data rate, and/or stronger encoding (e.g., using more bits for encoding).

Scheduling for communication based on location information may comprise performing scheduling based on a distance of the one or more terminals from one or more radioheads. Location information may represent one or more zones in relation to one or more radioheads, in particular a zone in and/or around and/or comprising the middle between radioheads (middle zone), and one or more zones that are closed than this zone to at least one radio head (close zone/s).

Prioritizing one or more terminals may comprise assigning resources to one or more terminals based on a priority, and/or allocating more resources to prioritized terminal/s than to non-prioritized terminal/s. For example, non-prioritized terminals may not be allocated resources (time/frequency resources), e.g. if they are in a middle zone.

Scheduling based on location information may comprise associating (and/or determining or sorting) one or more terminals to (e.g., different) groups (and/or sets) based on their location, e.g. based on the zone/s they are in. For example, to one group or set terminals in a middle zone may be associated, to another group or set terminals in a close zone may be associated. Scheduling based on capability information may comprise associating one or more terminal to one or more groups or sets based on one or more capabilities. For example, terminals with advanced receiver may be associated to one group or set, terminals without such (and/or with deactivated ones) to another.

Prioritizing may be performed such that terminals without advanced receiver (as indicated by capability information) are prioritized higher than terminals with advanced receiver in a close zone, and/or are prioritized lower in a middle zone. Lower prioritized terminals may be allocated no resources, in particular terminals without advanced receiver in a middle zone.

The scheduling and/or prioritizing may be performed for each pair of neighboring radioheads out of a plurality of such pairs, which may e.g. be arranged along a traffic link.

The network node described herein may in particular be a network node for a railway wireless communication system or network.

BRIEF DESCRIPTION OF THE DRAWINGS

The drawings are provided to illustrate the approaches and concepts discussed herein, and are not intended to limit their scope.

The drawings comprise

DETAILED DESCRIPTION

Figure 1:
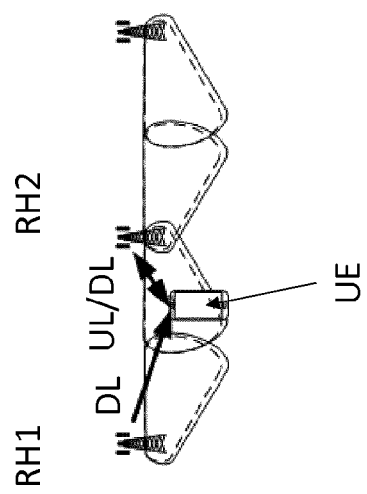
FIG. 1, showing a scenario of a moving UE.

In the following, it may be referred to LTE as an exemplary Radio Access Network (RAN). However, the approaches described are applicable for other types of Radio Access Network, e.g. a NR RAN. The terms "terminal" and "user equipment" may be used interchangeably.

A radiohead (RH, or RRH, Remote Radio Head), may be considered a transmitting and/or receiving unit connected to a network node, which may control and/or utilize the radiohead for transmitting and/or receiving. A radiohead may comprise radio circuitry, e.g. receiver and/or transmitter and/or transceiver, and/or antenna circuitry and/or one or more antennas. A network node may be adapted to utilise, and/or be connected to, two or more radioheads, e.g. for simultaneous transmission and/or reception. Such radioheads may be referred to as associated to the network node. The network node may be implemented and/or comprise a radiohead itself.

Generally, the radioheads may be adapted to transmit and/or receive simultaneous, and/or synchronized and/or the same signaling (e.g., controlled by the network node). The radioheads associated to a network node may represent and/or provide the same cells and/or cell arrangements (e.g., in carrier aggregation), in particular the same serving cell. Radioheads may be arranged, and/or arrangeable, along a traffic link, e.g. a railway track. A moving vehicle may move on and/or along this traffic link. A terminal between two radioheads may be considered in a bidirectional scenario, as it will receive signaling Doppler-shifted in both directions if moving.

If the network or network node allocates resources to all UEs according to received measurement reports, in particular CQI reports, resources may be wasted (with low data rates), since the performance will vary very much in different parts of the scenario, as will the CQI report when a UE is in the middle between the RRHes, which thus is not reliable. This is particularly true for legacy UEs. The approaches described herein alleviate these issues in particular for legacy UEs (without advanced receiver).

Even with advanced receiver the reported CQI still gives uncertainty when the UE is in between of 2 RRHs so the same issue also happens for the advanced receiver but in a less severe way than the legacy receiver.

Since the data throughput is varying over a cycle when passing the radio heads and the legacy UEs have a bad degradation of performance between the radio heads, an approach is proposed in which UEs are not scheduled (not waste system resources on them when the condition is very bad), when they are between the radio heads (e.g., in a middle zone), and it can be assumed they have a problem with the demodulation performance. Instead, the advanced receivers (Rel-14 UEs with advanced receivers) may be prioritized when the conditions are bad for the legacy UEs. In a good situation, when the UEs are much closer to one radio head than the other ones, all UEs can be scheduled and possibly the legacy UEs can be prioritized in order to compensate the lack of data between the radio heads.

A scenario with a High Speed Train and a deployment consisting of bidirectional deployment of radioheads is envisioned and described with reference to FIG. 1 (RH1 and RH2 indicate two radioheads associated to the same network node). The radiation profiles of the RHs are indicated, which represent a cell.

Figure 2:
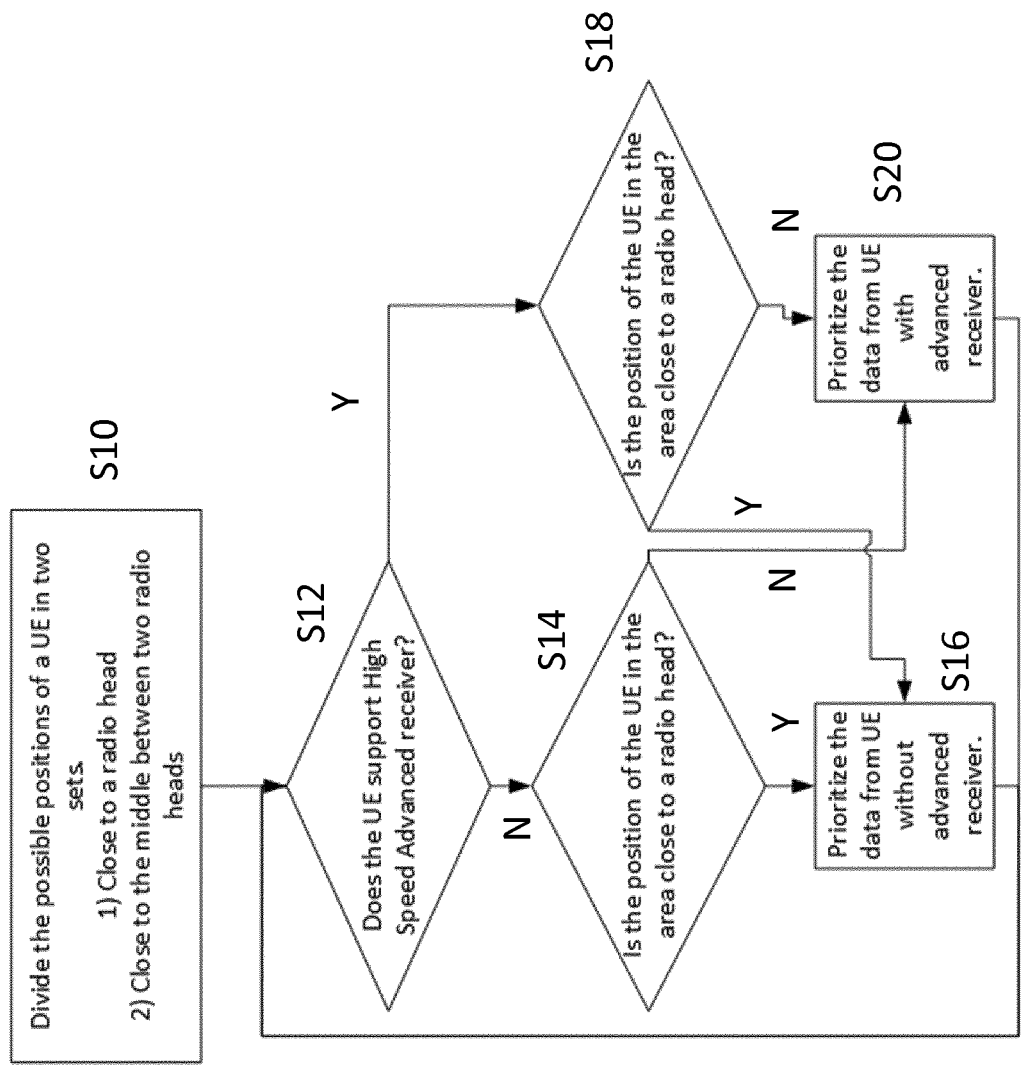
FIG. 2, showing an exemplary method for operating a network node.

FIG. 2 shows an exemplary method for operating a network node. Two areas or zones are determined, and the terminals to be scheduled (e.g., in the vehicle) may be divided into two associated sets or groups. One of the areas is considered close to some radiohead. In this area, the propagation channel to the UE consists of one main (dominant) path so a legacy receiver tracking that path has a good performance.

The other area or zone is where the a UE is close to the middle between the radio heads (middle zone), where it receives a two strong paths which have very different Doppler shifts due to the high speed of the vehicle, and paths are received both from radio heads ahead of the UE and from the back (bidirectional). In this area or zone, the UE with advanced receiver has a good performance but the legacy UE has a poor performance with fluctuating CQI reports.

Based on this, the CQI reports from a legacy UEs when the UE is in the area close to the middle between the radio heads may not be reliable and may be considered not to be trusted. In this area or zone, the system capacity shall be spent on the UEs with advanced receivers (scheduling may be performed accordingly).

In the area close to a radio head, the network node (e.g., a scheduler in the base station) knows that the performance of both the legacy receiver as well as the UE with advanced receiver is good. In this area, the network node or scheduler can either compensate the legacy UE that it is not scheduled in the area in the middle between the radio heads and prioritize the legacy UE when scheduling data, or it may treat all UEs equal and thereby send data to all UEs in this area.

Figure 3:
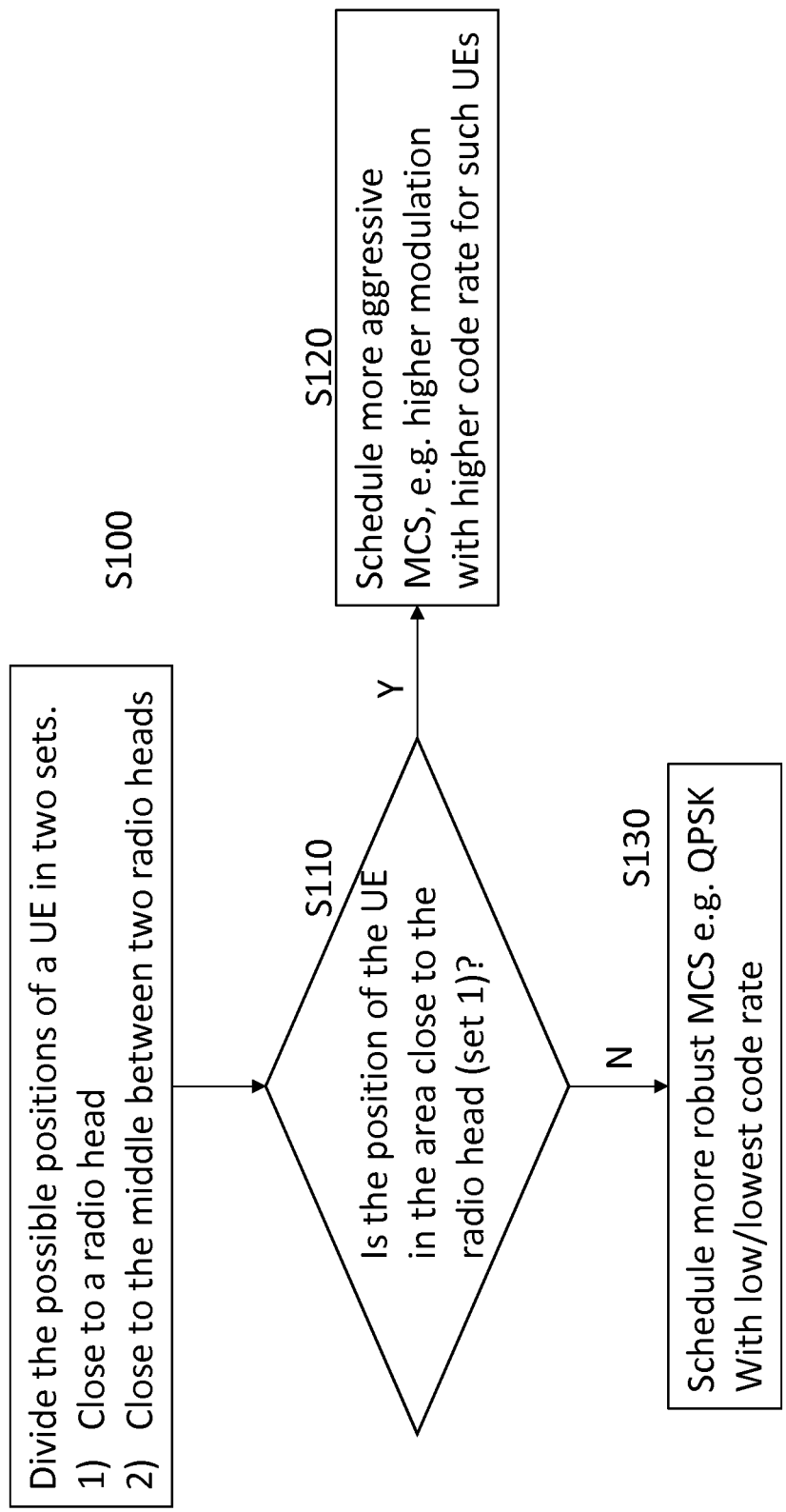
FIG. 3, showing another exemplary method for operating a network node.

Alternatively or additionally, the eNB (eNodeB, as an example of a network node) could schedule more robust MCS for both legacy receiver UEs and advanced receiver UEs when they are in between the RRHs to have a more robust performance without too high BLER (BLock Error Rate). An exemplary flow diagram for a corresponding method is shown in FIG. 3.

Figure 4:
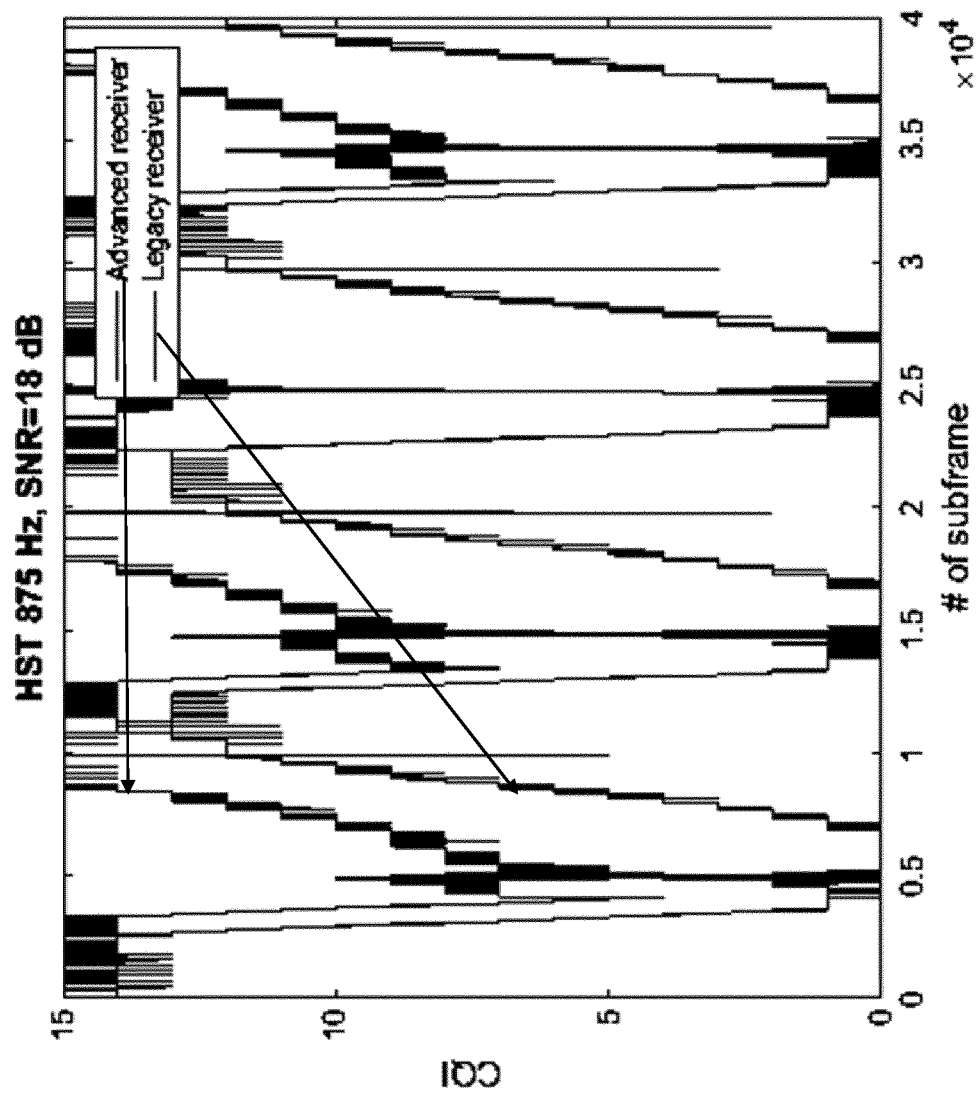
FIG. 4, showing receiver behaviour.

In FIG. 4, the CQI reports from the legacy UE (without advanced receiver) and from an UE with advanced receiver are shown. It may be seen that the performance of the two types of receivers differs especially when the UE is between the radio heads and receives two paths with different frequencies. Based on this, the network node may identify or determine if the UE has advanced receiver capability or not.

In this figure, the reported CQI is plotted in a scenario where the radio heads are passed with around 10000 subframes (ms) between each other. It is 1000 m between each radio head and the UE is moving with 350 km/h meaning 97.2 m/s. Therefor the radio heads are passed at approximately 0 ms, 1000 ms 2000 ms and 3000 ms. The reported CQI from an advanced receiver according to current suggestions and a legacy, LTE Rel-10 receiver are shown. When passing the radio heads, the difference is quite small (CQI=13 instead of 15), but when the UE is between the radio heads e.g. at 500 subframes, there is quite large difference between the CQI for the advanced receiver (CQI is about 7-8) and the legacy receiver.

Figure 5:
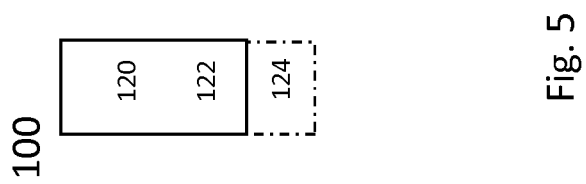
FIG. 5, showing an exemplary network node.

FIG. 5 shows an exemplary radio node 100, which may be implemented as a network node. Radio node 100 comprises control circuitry 120, which may comprise a controller connected to a memory. Any module, e.g. receiving module and/or transmitting module and/or configuring module (e.g., for configuring a terminal) of the radio node may be implemented in and/or executable by the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The radio node 100 may be adapted to carry out any of the methods for operating a radio node or network node disclosed herein; in particular, it may comprise corresponding circuitry, e.g. control circuitry. The antenna circuitry may be connected to and/or comprise an antenna array.

Figure 6:
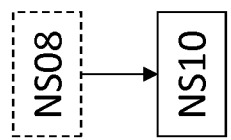
FIG. 6, showing a flow diagram of an exemplary method for operating a network node.

FIG. 6 shows a flow diagram of an exemplary method for operating a network node, which may be any network node described herein. The method may comprise an action NS10 of scheduling for communication one or more terminals based on location information and/or capability information pertaining to the one or more terminals. The terminal/s may be in a moving vehicle. The method may optionally comprise an action NS08 of determining capability information (which may represent a capability, in particular advanced receiver capability) of one or more terminals based on measurement reporting.

Figure 7:
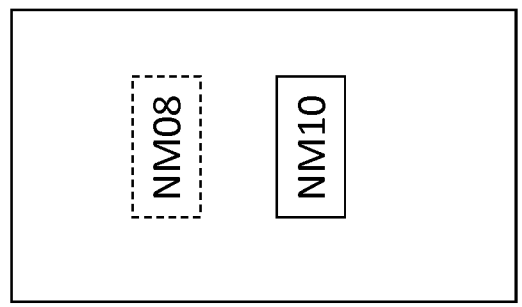
FIG. 7, showing another exemplary network node.

FIG. 7 shows an exemplary network node, which may be any network node discussed herein. The network node may be adapted for, and/or comprise a scheduling module NM10 for, performing action NS10. It may be considered that the network node is adapted for, and/or comprises a determining module NM08 for, performing action NS08.

Generally, there may be considered a network node adapted for performing any one of the methods for operating a network node described herein.

There may be considered a terminal or user equipment adapted for performing any one of the methods for operating a radio node described herein.

There is also disclosed a program product comprising code executable by control circuitry, the code causing the control circuitry to carry out and/or control any one of the method for operating a radio node as described herein, in particular if executed on control circuitry, which may be control circuitry of a user equipment or a network node.

Moreover, there is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Resources may generally comprise time/frequency resources for communication, and/or associated power and/or codes, e.g. depending on the multiplexing scheme used. References to resources, radio resources and/or time and/or frequency resources (e.g., subframe, slot, symbol or resource block) may refer to such resources structured according to 3GPP standards, in particular LTE and/or NR. It may be considered that decoding may comprise decoding of error detection coding and/or forward error coding. The extracted information may generally be and/or comprise control information, in particular in a scheduling assignment. It may be considered that the extracted information is received on a control channel and/or is based on control channel signaling. Control channel signaling may in particular be signaling on a physical control channel.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA and/or NR. Radio circuitry may comprise for example a receiver and/or transmitter and/or transceiver. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D (Device-To-Device) capable or enabled. It may be considered that a terminal or user equipment comprises radio circuitry and/control circuitry for wireless communication. Radio circuitry may comprise for example a receiver device and/or transmitter device and/or transceiver device, and/or one or more receivers and/or transmitters and/or transceivers. Control circuitry may include one or more controllers, which may comprise a microprocessor and/or microcontroller and/or FPGA (Field-Programmable Gate Array) device and/or ASIC (Application Specific Integrated Circuit) device.

It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A terminal may be adapted for one or more (cellular) Radio Access Technologies (RATs), e.g. LTE and/or UMTS and/or a 5G RAT, e.g. LTE Evolution and/or NR). Generally, a terminal may be any device adapted for wireless communication via D2D and/or one or more cellular RATs. A wireless communication network may comprise two or more terminals communicating via D2D communication, and/or a terminal communicating with a radio access node of a RAN (Radio Access Network) implementing one or more RATs. Such a radio access node may e.g. be an eNodeB. It may generally be considered that a terminal represents a device capable of serving as an end or termination point of a communication. A terminal may be a user equipment or phone or smart phone or computing device or sensor device or machine or vehicular device adapted for wireless communication like MTC and/or using narrowband as described herein. It may be considered that a terminal or UE is mobile. However, there may be envisioned variants in which a terminal or UE is stationary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate. A radio node may generally be a network node or a terminal and/or user equipment.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively or additionally, a cell may comprise at least one carrier for UL communication/transmission and DL communication/transmission, e.g., in TDD-based approaches.

A channel may generally be a logical or physical channel. A channel may comprise and/or be arranged on one or more carriers, in particular a plurality of subcarriers.

A wireless communication network may comprise at least one network node, in particular a network node as described herein. A terminal connected or communicating with a network may be considered to be connected or communicating with at least one network node, in particular any one of the network nodes described herein.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g., around 5 GHz.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/ or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, control circuitry (which may also be referred to as processing circuitry) may comprise integrated circuitry for processing and/or control, e.g., one or more processors and/or processor cores and/or FPGAs (Field Programmable Gate Array) and/or ASICs (Application Specific Integrated Circuitry). Control circuitry may comprise and/or be connected to and/or be adapted for accessing (e.g., writing to and/or reading from) memory, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g., data pertaining to communication, e.g., configuration/s and/or address data of nodes, etc. Control circuitry may be adapted to control any of the methods described herein and/or to cause such methods to be performed, e.g., by the radio node. Corresponding instructions may be stored in the memory, which may be readable and/or readably connected to the control circuitry. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

Radio circuitry may comprise receiving circuitry (e.g., one or more receivers) and/or transmitting circuitry (e.g., one or more transmitters). Alternatively or additionally, radio circuitry may comprise transceiving circuitry for transmitting and receiving (e.g., one or more transceivers). Radio circuitry may generally comprise, for example, a receiver device and/or transmitter device and/or transceiver device.

Antenna circuitry may comprise and/or be connected or connectable to one or more antennas or antenna elements, which may be arranged in an antenna array. It may be considered that antenna circuitry comprises one or more additional elements and/or is connected or connectable to one or more additional elements.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node.

Generally, configuring may include determining configuration data representing the configuration and providing it to one or more other nodes (parallel and/or sequentially), which may transmit it further to the radio node (or another node, which may be repeated until it reaches the wireless device). Alternatively or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

A channel may generally be a logical or physical channel. A channel may comprise and/or be arranged on one or more carriers, in particular a plurality of subcarriers. A control channel may be such a channel. A communication may generally involve transmitting and/or receiving messages, in particular in the form of packet data. A message or packet may comprise control and/or configuration data and/or payload data and/or represent and/or comprise a batch of physical layer transmissions. Control and/or configuration information or data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Generally, a message may comprise one or more signals and/or symbols.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Measurement reporting, e.g. comprising a CQI report, may be related to a CSI process. Measurement reporting may generally pertain to specific signaling (or an associated port), which may be indicated or configured to the terminal by the network or network node, e.g. by transmitting corresponding configuration data. Measurement reporting may generally indicate a preferred port or port combination (or precoder or precoder combination) to be used, which may be referred to as port or precoder selection. In particular, a configuration may indicate the pattern determined for RS and/or used for RS transmission (e.g., by the network node), in particular CSI-RS.

A measurement process like a CSI process may generally comprise receiving (e.g., by a UE), from a transmitting node or network node, reference signaling (CSI-RS), and providing a report like measurement report based on the received reference signaling. The report or measurement report may in particular indicate or comprise CSI information, in particular CQI (Channel Quality Indicator), PMI (Precoding Matrix Indicator) and/or RI (Rank Indicator), and/or a beam selection report or indication indicating which beam is selected by the measuring device like a terminal.

A licensed band or spectrum may be a part of the frequency spectrum that is and/or has to be licensed for use, e.g. by a telecommunications operator. An unlicensed band or spectrum may be a part of the frequency spectrum that is available without such license. WLAN/WiFi usually uses such unlicensed bands. The requirements for using licensed bands are usually quite different from unlicensed bands, e.g. due to licensed bands being controlled by one operator, whereas unlicensed bands usually are not subject to a centralized operator. Thus, Listen-Before-Talk, LBT, procedures are usually required for unlicensed bands, which may be adapted to facilitate fair distribution of access to the unlicensed spectrum.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

The invention claimed is:

1. A network node for a wireless communication network, the network node being adapted for scheduling for communication of one or more terminals, the terminals being in a moving vehicle, based on location information and capability information pertaining to the one or more terminals, the network node comprising:
a control circuitry configured to:
receive location information and capability information from one or more terminals;
for each terminal from the one or more terminals, based on the location information and the capability information:
in response to determining that the terminal is located in a middle zone between two radio heads and the terminal is not capable of receiving data with a bandwidth covering transmission frequencies from both of the radio heads, allocate less resources to the terminal compared to other terminals in the middle zone; and
in response to determining that the terminal is located in a close zone to a radio head of the two radio heads and the terminal is not capable of receiving data with the bandwidth covering transmission frequencies from both of the radio heads, allocate more resources to the terminal compared to other terminals in the close zone.

2. The network node according to claim 1, wherein, scheduling is further based on movement information pertaining to the one or more terminals.

3. The network node according to claim 1, the network node being adapted for transmitting signaling to, and/or receiving signaling from, the one or more terminals utilising two or more radio heads.

4. The network node according to claim 3, wherein the location information indicates a location of the one or more terminals in relation to one or more, in particular two, of the radio heads.

5. The network node according to claim 1, wherein scheduling comprises configuring one or more of the terminals with a modulation and coding scheme based on information pertaining to the one or more terminals.

6. The network node according to claim 1, wherein scheduling comprises prioritizing one or more of the terminals for communication based on capability information and/or location information pertaining to the one or more terminals.

7. A method for operating a network node in a wireless communication network, the method comprising scheduling for communication of one or more terminals, the terminals being in a moving vehicle, based on location information and capability information pertaining to the one or more terminals, the method comprising:
- receiving location information and capability information from the one or more terminals;
- for each terminal from the one or more terminals, based on the location information and the capability information:
  - in response to determining that the terminal is located in a middle zone between two radio heads and the terminal is not capable of receiving data with a bandwidth covering transmission frequencies from both of the radio heads, allocating less resources to the terminal compared to other terminals in the middle zone; and
  - in response to determining that the terminal is located in a close zone to a radio head of the two radio heads and the terminal is not capable of receiving data with the bandwidth covering transmission frequencies from both of the radio heads, allocating more resources to the terminal compared to other terminals in the close zone.

8. The method according to claim 7, wherein scheduling is further based on movement information pertaining to the one or more terminals.

9. The method according to claim 7, wherein the location information indicates a location of the one or more terminals in relation to one or more, in particular two, radio heads adapted for transmission to, and/or reception from, the one or more terminals.

10. The method according to claim 7, wherein scheduling comprises configuring a modulation and coding scheme for the one or more terminals based on the information pertaining to the one or more terminals.

11. The method according to claim 7, wherein the network node transmits signaling to, and/or receives signaling from, the one or more terminals utilising two or more radio heads.

12. The method according to claim 7, wherein scheduling comprises prioritizing one or more of the terminals for communication based on capability information and/or location information pertaining to the one or more terminals.

13. A computer readable non-transitory storage medium storing a computer program which, when executed on at least one processor, causes the at least one processor to carry out and control a method according to claim 7.

* * * * *